US011560151B2

(12) United States Patent
Kishimoto et al.

(10) Patent No.: US 11,560,151 B2
(45) Date of Patent: Jan. 24, 2023

(54) VEHICLE CONTROL SYSTEM

(71) Applicant: HONDA MOTOR CO., LTD., Tokyo (JP)

(72) Inventors: Takashi Kishimoto, Saitama (JP); Yoshifumi Nakamura, Saitama (JP); Noriyuki Imaeda, Saitama (JP); Daiki Higuchi, Saitama (JP); Jun Ishii, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 17/111,862

(22) Filed: Dec. 4, 2020

(65) Prior Publication Data

US 2021/0171059 A1 Jun. 10, 2021

(30) Foreign Application Priority Data

Dec. 9, 2019 (JP) .............................. JP2019-222118

(51) Int. Cl.
*B60W 60/00* (2020.01)
*G06V 20/56* (2022.01)

(52) U.S. Cl.
CPC ........... *B60W 60/001* (2020.02); *G06V 20/56* (2022.01); *B60W 2420/42* (2013.01); *B60W 2554/4049* (2020.02)

(58) Field of Classification Search
CPC ........... B60W 60/001; B60W 2420/42; B60W 2420/52; B60W 2420/403;
(Continued)

(56) References Cited

U.S. PATENT DOCUMENTS 10,223,384 B2 * 3/2019 Ono ...................... H04N 5/77
2009/0024274 A1 * 1/2009 Nagai .................... G01D 9/005
701/33.4
(Continued)

FOREIGN PATENT DOCUMENTS

JP 2012146136 * 8/2012 ............... G07C 5/00
JP 2012146136 A 8/2012
(Continued)

OTHER PUBLICATIONS

English Translation of Japanese Publication No. 2012146136 (Year: 2012).*
(Continued)

*Primary Examiner* — Russell Frejd
*Assistant Examiner* — Brandon Z Willis
(74) *Attorney, Agent, or Firm* — Armstrong Teasdale LLP

(57) ABSTRACT

A vehicle control system includes a recording device configured to record vehicle information in files. The recording device includes: an event information receiving unit configured to receive information about prescribed events; a tag providing unit configured to provide protection tags to the files, the protection tags being of different types according to magnitude of the events; and an overwriting setting unit configured to prohibit overwriting of the files provided with the protection tags of a same type in a case where the number of the files provided with the protection tags of the same type is within a prescribed upper limit number, and to permit the overwriting of the files provided with the protection tags of the same type in a case where the number of the files provided with the protection tags of the same type exceeds the upper limit number.

9 Claims, 5 Drawing Sheets

Figure 1:
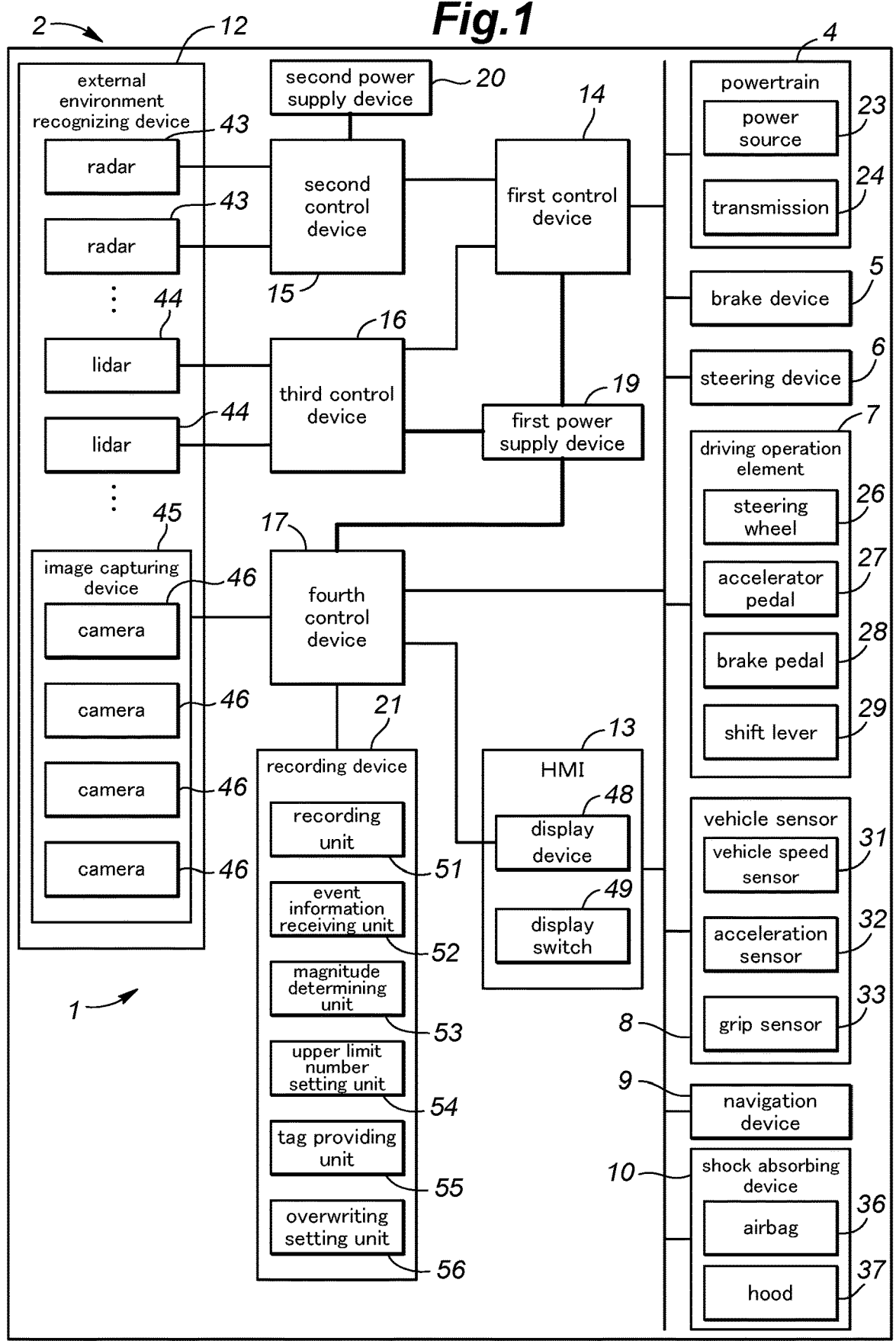

(58) Field of Classification Search
CPC ..... B60W 2422/95; B60W 2554/4049; B60W 2556/10; B60W 2556/30; G06V 20/56; G06V 20/58; G11B 2020/10898; G11B 2020/10712; G11B 23/288
See application file for complete search history.

(56) References Cited

U.S. PATENT DOCUMENTS

| | | | | |
|---|---|---|---|---|
| 2013/0302758 A1* | 11/2013 | Wright | ............ | G09B 19/14 |
| | | | | 701/1 |
| 2018/0218758 A1* | 8/2018 | Maeda | ............ | G07C 5/0866 |
| 2020/0176029 A1* | 6/2020 | Yamada | ............ | G06Q 10/10 |
| 2020/0252577 A1* | 8/2020 | Teruuchi | ............ | G11B 27/031 |

FOREIGN PATENT DOCUMENTS

| | | |
|---|---|---|
| JP | 6035032 B2 | 11/2016 |
| JP | 2018124823 A | 8/2018 |
| JP | 2018173760 A | 11/2018 |
| JP | 2019200777 A | 11/2019 |

OTHER PUBLICATIONS

Notice of Reasons for Refusal for Patent Application JP 2019-222118 dated Mar. 1, 2022; 8 pp.

* cited by examiner

Fig.3

| presence/ absence of event | magnitude of event | upper limit number | tag |
|---|---|---|---|
| absence | | | non-protection tag T0 |
| presence | high | 15 | protection tag T1 |
| presence | middle | 15 | protection tag T2 |
| presence | low | 15 | protection tag T3 |

Fig.4

| presence/ absence of event | magnitude of event | upper limit number | tag |
|---|---|---|---|
| absence | | | non-protection tag T0 |
| presence | high | | protection tag T1 |
| presence | middle | 15 | protection tag T2 |
| presence | low | 15 | protection tag T3 |

VEHICLE CONTROL SYSTEM

TECHNICAL FIELD

The present invention relates to a vehicle control system.

BACKGROUND ART

Conventionally, a vehicle control system includes a recording device configured to record vehicle information (for example, a surrounding image of a vehicle) in files for each time range in which the vehicle information is acquired. Such a vehicle control system executes overwriting prohibition processing for each file in which the vehicle information acquired at the occurrence of a prescribed event is recorded, thereby protecting the above-mentioned files (for example, Japanese Patent No. 6035032).

However, in such a conventional vehicle control system, the magnitude of the events is not considered when the overwriting prohibition processing for the files is executed. Accordingly, it is difficult to protect an appropriate number of files according to the magnitude of the events.

SUMMARY OF THE INVENTION

In view of such a problem of the prior art, a primary object of the present invention is to protect an appropriate number of files according to the magnitude of events, in a vehicle control system including a recording device configured to record vehicle information in the files for each time range in which the vehicle information is acquired.

To achieve such an object, one embodiment of the present invention provides a vehicle control system (1) including: a vehicle information acquiring unit (45) configured to acquire vehicle information; and a recording device (21) configured to record the vehicle information in files for each time range in which the vehicle information is acquired, wherein the recording device includes: an event information receiving unit (52) configured to receive information about prescribed events that have occurred with regard to a vehicle; a tag providing unit (55) configured to provide protection tags (T1 to T3) to the files in which the vehicle information acquired at occurrence of the events is recorded, the protection tags being of different types according to magnitude of the events; and an overwriting setting unit (56) configured to prohibit overwriting of the files provided with the protection tags of a same type in a case where the number of the files provided with the protection tags of the same type is within a prescribed upper limit number, and to permit the overwriting of the files provided with the protection tags of the same type in a case where the number of the files provided with the protection tags of the same type exceeds the upper limit number.

According to this arrangement, it is possible to provide the protection tags of different types to the files according to the magnitude of the events, and to stop protecting the files only when the number of files provided with the protection tags of the same type exceeds the upper limit number. Accordingly, it is possible to protect an appropriate number of files according to the magnitude of the events.

In the above arrangement, preferably, the overwriting setting unit is configured to permit overwriting of an oldest file of the files provided with the protection tags of the same type in the case where the number of the files provided with the protection tags of the same type exceeds the upper limit number.

According to this arrangement, it is possible to overwrite the files in proper order in a case where the files provided with the protection tags of the same type need to be overwritten.

In the above arrangement, preferably, the recording device further includes an upper limit number setting unit (54) configured to set the upper limit number according to the magnitude of the events for the events of all the magnitude.

According to this arrangement, the total number of files whose overwriting is prohibited can always be kept within a certain number. Accordingly, it is possible to avoid a situation where an inside area of the recording device is filled with the files whose overwriting is prohibited.

In the above arrangement, preferably, the recording device further includes an upper limit number setting unit configured to set the upper limit number according to the magnitude of the events for the events other than the events of highest magnitude, and the overwriting setting unit is configured to always prohibit overwriting of the files provided with the protection tags corresponding to the events of the highest magnitude.

According to this arrangement, it is possible to always protect the files provided with the protection tags corresponding to the events of the highest magnitude, and thus to easily identify the cause of the events of the highest magnitude.

In the above arrangement, preferably, in a case where the vehicle information acquired at occurrence of plural events is recorded in one file, the tag providing unit is configured to provide the protection tag to the one file according to magnitude of one event included in the plural events, the magnitude of the one event being the highest of the magnitude of the plural events.

According to this arrangement, an appropriate protection tag can be provided to the one file in a case where the plural events occur simultaneously.

In the above arrangement, preferably, the tag providing unit is configured to provide the protection tags to the files immediately before and after each file in which the vehicle information acquired at occurrence of each event is recorded.

According to this arrangement, it is possible to protect not only each file in which the vehicle information acquired at occurrence of each event is recorded but also the files immediately before and after each file, and thus to easily identify the cause of each event.

In the above arrangement, preferably, the tag providing unit is configured to set a reference time (X) based on a time required for an emergency stop of the vehicle, and the tag providing unit is configured to provide the protection tag to each file in which the vehicle information acquired at a time earlier than occurrence of each event by the reference time is recorded.

According to this arrangement, it is possible to protect not only each file in which the vehicle information acquired at occurrence of each event is recorded but also another file in which important vehicle information regarding each event is likely to be recorded. Accordingly, it is possible to easily identify the cause of each event.

In the above arrangement, preferably, the vehicle control system further includes a control device (14) configured to execute automatic driving control of the vehicle.

According to this arrangement, the control device executes the automatic driving control of the vehicle, so that a driving load of an occupant can be reduced.

In the above arrangement, preferably, the vehicle information acquiring unit includes an image capturing device configured to capture a surrounding image of the vehicle, and the image capturing device includes plural cameras (46) configured to capture images of a front side, a rear side, a left side, and a right side of the vehicle, respectively.

According to this arrangement, it is possible to accurately recognize a surrounding situation of the vehicle based on the surrounding image of the vehicle captured by the image capturing device.

In the above arrangement, preferably, the tag providing unit is configured to provide non-protection tags (T0) to the files in which the vehicle information acquired at occurrence of the events is not recorded.

Thus, according to the above arrangements, it is possible to protect an appropriate number of files according to the magnitude of events, in a vehicle control system including a recording device configured to record vehicle information in the files for each time range in which the vehicle information is acquired.

BRIEF DESCRIPTION OF THE DRAWING(S)

Figure 2:
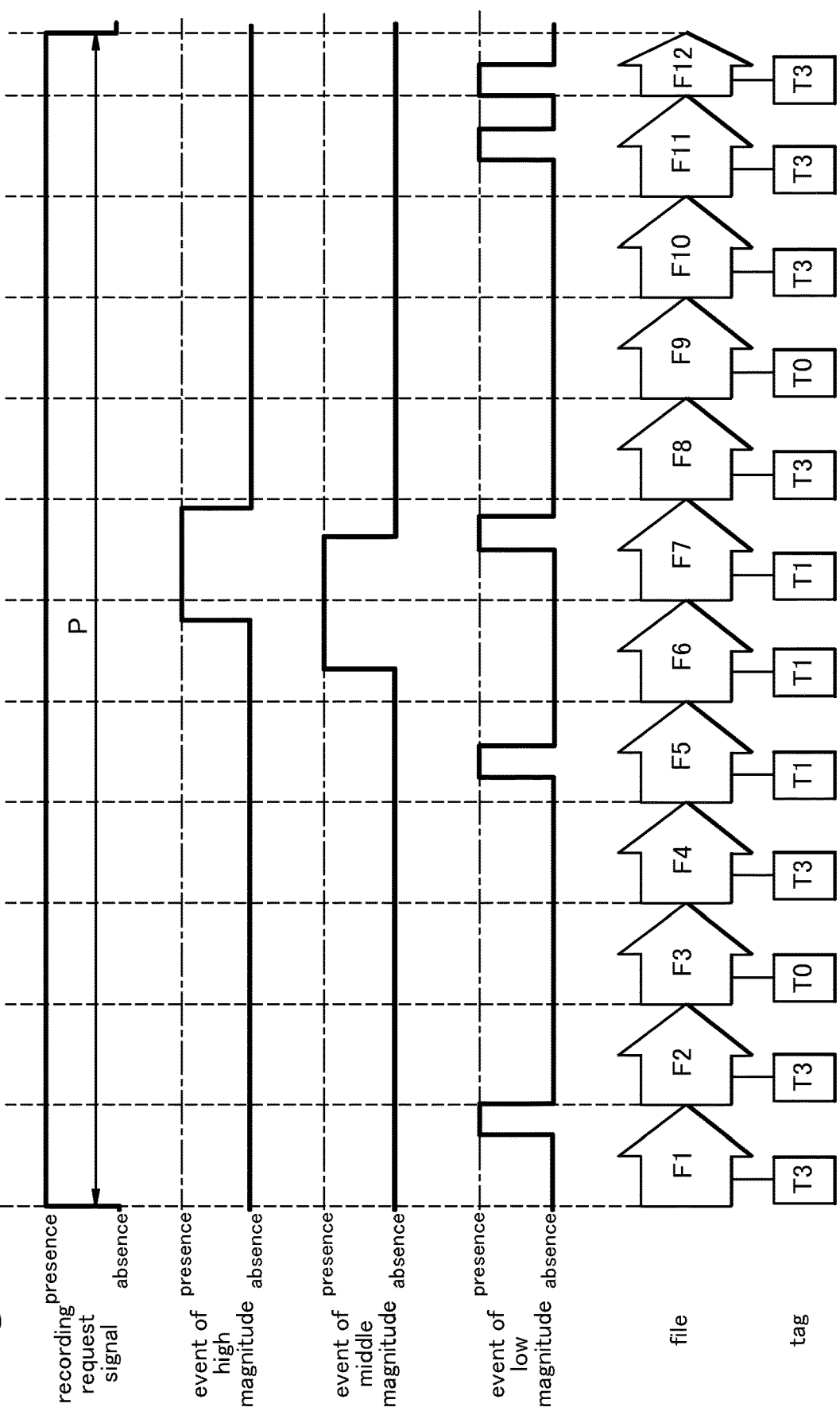
Figure 5:
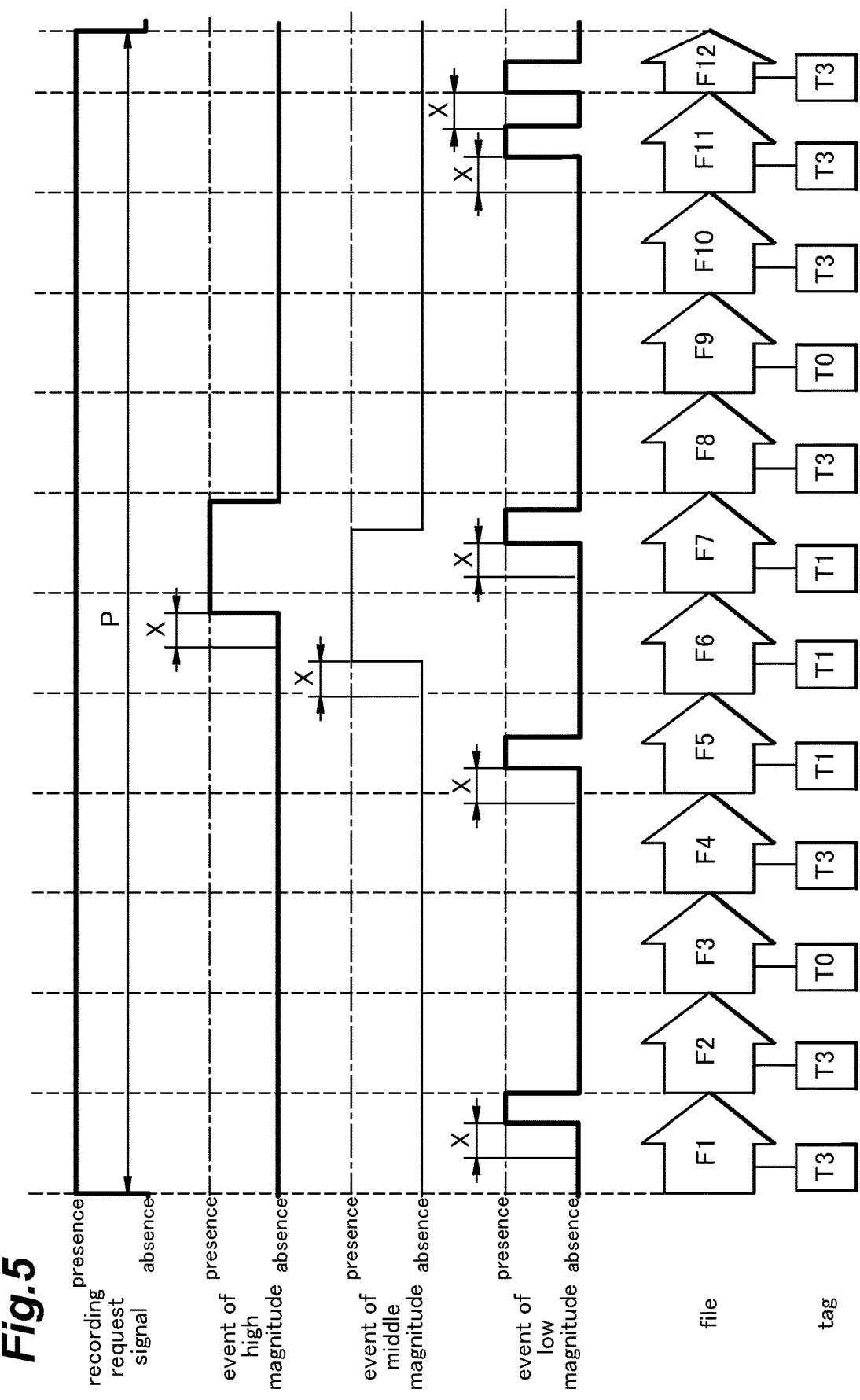

FIG. 1 is a block diagram of a vehicle control system according to an embodiment;
FIG. 2 is a timing diagram showing a providing method of tags;
FIG. 3 is a table showing the providing method of the tags;
FIG. 4 is a table showing a modification of the providing method of the tags; and
FIG. 5 is a timing diagram showing another modification of the providing method of the tags.

DESCRIPTION OF THE PREFERRED EMBODIMENT(S)

<The Vehicle Control System 1>

In the following, a vehicle control system 1 according to an embodiment of the present invention will be described with reference to the drawings. The vehicle control system 1 is mounted on a vehicle 2 such as a four-wheeled automobile, and is configured to control the vehicle 2.

With reference to FIG. 1, the vehicle control system 1 includes a powertrain 4, a brake device 5, a steering device 6, a driving operation element 7, a vehicle sensor 8, a navigation device 9, a shock absorbing device 10, an external environment recognizing device 12, a Human Machine Interface 13 (HMI), first to fourth control devices 14 to 17, first and second power supply devices 19 and 20, and a recording device 21. In the following, the above-mentioned components of the vehicle control system 1 will be described one by one.

The powertrain 4 is a device configured to apply a driving force to the vehicle 2. For example, the powertrain 4 includes a power source 23 and a transmission 24. The power source 23 includes at least one of an internal combustion engine such as a gasoline engine or a diesel engine and an electric motor.

The brake device 5 is a device configured to apply a brake force to the vehicle 2. For example, the brake device 5 includes a brake caliper configured to press a pad against a brake rotor, and an electric cylinder configured to supply an oil pressure to the brake caliper.

The steering device 6 is a device configured to change a steering angle of wheels. For example, the steering device 6 includes a rack-and-pinion mechanism configured to steer (turn) the wheels, and an electric motor configured to drive the rack-and-pinion mechanism.

The driving operation element 7 is an operation element provided inside a vehicle cabin and configured to receive a driving operation of the vehicle 2 by an occupant. For example, the driving operation element 7 includes a steering wheel 26 configured to receive a steering operation of the vehicle 2, an accelerator pedal 27 configured to receive an acceleration operation of the vehicle 2, a brake pedal 28 configured to receive a brake operation of the vehicle 2, a shift lever 29 configured to receive an operation for switching a shift range of the vehicle 2. For example, the shift range of the vehicle 2 includes a forward range, a reverse range, a neutral range, a parking range, and the like. The forward range is a shift range to transmit a driving force of the power source 23 to the wheels and thus to move the vehicle 2 forward. The reverse range is a shift range to transmit the driving force of the power source 23 to the wheels and thus to reverse the vehicle 2. The neutral range is a shift range in which the wheels are rotatable and the driving force of the power source 23 is not transmitted to the wheels. The parking range is a shift range in which the rotation of the wheels is restricted and the driving force of the power source 23 is not transmitted to the wheels.

The vehicle sensor 8 is a sensor configured to detect various vehicle states (namely, various states of the vehicle 2). For example, the vehicle sensor 8 includes a vehicle speed sensor 31 configured to detect the vehicle speed of the vehicle 2, an acceleration sensor 32 configured to detect the acceleration of the vehicle 2, and a grip sensor 33 configured to detect that the occupant grips the steering wheel 26.

The navigation device 9 is a device configured to acquire the current position of the vehicle 2 and to provide route guidance to a destination or the like. The navigation device 9 includes a GPS receiving unit and a map storing unit. The GPS receiving unit is configured to identify the current position (latitude and longitude) of the vehicle 2 based on a signal received from an artificial satellite (positioning satellite). The map storing unit includes a flash memory, a hard disk, and the like, and is configured to store map information.

The shock absorbing device 10 is a device configured to absorb a shock caused by a collision (hereinafter referred to as "vehicle collision") between the vehicle 2 and an object outside the vehicle 2 (for example, another vehicle, an obstacle, or a pedestrian). For example, the shock absorbing device 10 includes an airbag 36 and a hood 37 (a pop-up hood). For example, the airbag 36 is provided in the steering wheel 26 and/or a passenger seat. The airbag 36 is deployed at occurrence of the vehicle collision, thereby reducing an impact on the occupant. For example, the hood 37 is configured to cover the power source 23 from above. The hood 37 is partially lifted at the occurrence of the vehicle collision, thereby forming a space between the hood 37 and the power source 23 and reducing an impact on the pedestrian.

The external environment recognizing device 12 is a device configured to detect the object outside the vehicle 2. For example, the external environment recognizing device 12 includes plural radars 43, plural lidars 44, and an image capturing device 45 (an example of a vehicle information acquiring unit). Each radar 43 emits radio waves such as millimeter waves around the vehicle 2 and captures the reflected radio waves, thereby detecting a position of the object outside the vehicle 2 (the distance between the vehicle 2 and the object outside the vehicle 2 and the direction of the object outside the vehicle 2). Each lidar 44 emits light such as infrared rays around the vehicle 2 and captures the reflected light, thereby detecting the position of the object outside the vehicle 2. The image capturing device 45 is a device configured to capture a surrounding image of the vehicle 2 (an example of vehicle information; hereinafter simply referred to as "the surrounding image"). The surrounding image captured by the image capturing device 45 is a moving image. In another embodiment, the surrounding image captured by the image capturing device 45 may be a static image. The image capturing device 45 includes four cameras 46 configured to capture images of a front side, a rear side, a left side, and a right side of the vehicle 2, respectively. Accordingly, it is possible to accurately recognize a surrounding situation of the vehicle 2 based on the surrounding image captured by the image capturing device 45.

The HMI 13 is an input/output device configured to notify the occupant of various pieces of information and to receive an input operation by the occupant. For example, the HMI 13 includes a display device 48 and a display switch 49. The display device 48 includes a display screen such as a liquid crystal display or an organic EL display, and is configured to display the surrounding image. The display switch 49 is configured to receive a display operation of the surrounding image (namely, an operation to display the surrounding image) performed by the occupant.

Each of the first to fourth control devices 14 to 17 consists of an electronic control unit (ECU) including a CPU, a ROM, a RAM, and the like, and operates as the CPU executes arithmetic processing according to a program.

The first control device 14 is connected to the powertrain 4, the brake device 5, the steering device 6, the driving operation element 7, the vehicle sensor 8, the navigation device 9, the shock absorbing device 10, the HMI 13, and the like via a communication network such as a Controller Area Network (CAN).

The first control device 14 is configured to execute automatic driving control of the vehicle 2. When executing the automatic driving control, the first control device 14 controls at least one of the powertrain 4, the brake device 5, and the steering device 6 regardless of an operation on the driving operation element 7 by the occupant. For example, the automatic driving control executed by the first control device 14 includes Minimal Risk Maneuver (MRM), Side Collision Mitigation (SCM), Road Departure Mitigation (RDM), and Auto Lane Change (ALC). MRM is the control to move the vehicle 2 to a safe place and to cause an emergency stop of the vehicle 2 while degenerating the automatic driving control in a case where the occupant does not respond to the driving change request from the first control device 14. SCM is the control to move the vehicle 2 in a direction to avoid or mitigate the vehicle collision in a case where the object outside the vehicle 2 is detected approaching the side of the vehicle 2. RDM is the control to move the vehicle 2 in a direction to avoid or mitigate departure (deviation) of the vehicle 2 from a travel lane in a case where the departure of the vehicle 2 from the travel lane is detected or estimated. ALC is the control to automatically change lanes.

The first control device 14 is configured to execute manual driving control of the vehicle 2. When executing the manual driving control, the first control device 14 controls the powertrain 4, the brake device 5, and the steering device 6 according to the operation on the driving operation element 7 by the occupant. For example, when executing the manual driving control, the first control device 14 controls the powertrain 4 according to a signal from an accelerator pedal sensor configured to detect a pressing amount of the accelerator pedal 27, controls the brake device 5 according to a signal from a brake pedal sensor configured to detect a pressing amount of the brake pedal 28, and controls the steering device 6 according to a signal from a turning angle sensor configured to detect a turning angle of the steering wheel 26. In another embodiment, a control device configured to execute the manual driving control of the vehicle 2 may be separate from a control device configured to execute the automatic driving control of the vehicle 2.

The second control device 15 is connected to the radars 43 via the communication network. The second control device 15 receives detection signals from the radars 43 and thus integrates the received detection signals, thereby recognizing the position of the object outside the vehicle 2. The second control device 15 is connected to the first control device 14 via the communication network.

The third control device 16 is connected to the lidars 44 via the communication network. The third control device 16 receives detection signals from the lidars 44 and thus integrates the received detection signals, thereby recognizing the position of the object outside the vehicle 2. The third control device 16 is connected to the first control device 14 via the communication network.

The fourth control device 17 is connected to the powertrain 4, the brake device 5, the steering device 6, the driving operation element 7, the vehicle sensor 8, the navigation device 9, the shock absorbing device 10, the HMI 13, the first control device 14, and the like via the communication network. The fourth control device 17 is connected to the image capturing device 45 via a digital communication line. The fourth control device 17 is configured to receive the surrounding image from the image capturing device 45 and to integrate the received surrounding image. The fourth control device 17 is connected to the display device 48 via a digital communication line, and is configured to transmit the integrated surrounding image to the display device 48.

The fourth control device 17 is configured to execute automatic parking control of the vehicle 2. When executing the automatic parking control, the fourth control device 17 controls the powertrain 4, the brake device 5, and the steering device 6 regardless of the operation on the driving operation element 7 by the occupant, thereby automatically moving the vehicle 2 to a prescribed target parking position and to stop the vehicle 2 there.

Each of the first and second power supply devices 19 and 20 includes a power supply circuit and a battery. The first power supply device 19 is connected to the first control device 14, the third control device 16, and the fourth control device 17, and is configured to supply electric power to the first control device 14, the third control device 16, and the fourth control device 17. The second power supply device 20 is connected to the second control device 15, and is configured to supply electric power to the second control device 15.

The recording device 21 consists of an electronic control unit (ECU) including a CPU, a ROM, a RAM, and the like, and operates as the CPU executes arithmetic processing according to a program. The recording device 21 is connected to the fourth control device 17 via an analog communication line, and is configured to receive the surrounding image from the fourth control device 17. The recording device 21 is connected to the first control device 14 via the communication network and the fourth control device 17, and is configured to receive a recording request signal from the first control device 14. The recording device 21 is configured to record the surrounding image received from the fourth control device 17 in files for each time range in which the surrounding image is captured (an example of each time range in which the vehicle information is acquired) and to store the surrounding image in an inside area of the recording device 21 according to the recording request signal from the first control device 14. For example, while receiving the recording request signal from the first control device 14, the recording device 21 continuously (constantly) records the surrounding image received from the fourth control device 17 in the files and stores the surrounding image in the inside area of the recording device 21. In the following, the recording of the surrounding image by the recording device 21 will be further described.

<The Recording of the Surrounding Image by the Recording Device 21>

With reference to FIG. 1, the recording device 21 includes functional components such as a recording unit 51, an event information receiving unit 52, a magnitude determining unit 53, an upper limit number setting unit 54, a tag providing unit 55, and an overwriting setting unit 56.

With reference to FIG. 2, the recording unit 51 is configured to record the surrounding image received from the fourth control device 17 in the files for each time range in which the surrounding image is captured. The recording unit 51 is configured to record the surrounding image during a period P (hereinafter referred to as "recording request period P") in which the recording request signal from the first control device 14 continues. In FIG. 2, time progresses from the left to the right, and thus the file F1 is the oldest and the file F12 is the latest. The files adjacent to each other are temporally continuous (namely, no time interval is present between the files adjacent to each other).

The recording unit 51 is configured to create the files with the maximum length (for example, one minute) as many as possible according to the length of the recording request period P, and to create the files with the length less than the maximum length as necessary. For example, in a case where the recording request period P is 11 minutes and 30 seconds, the recording unit 51 creates 11 files with the length of one minute (see the files F1 to F11), and then creates one file with the length of 30 seconds (see the file F12).

The recording unit 51 is configured to record the surrounding image received from the fourth control device 17 in the files by using a ring buffer. More specifically, when the total number of files recorded in a buffer provided in the recording device 21 reaches a prescribed upper limit number (for example, about 200), the recording unit 51 overwrites specific files (namely, files which are recorded in the inside area of the recording device 21 and whose overwriting is permitted) with new files in order from the oldest one. In another embodiment, the recording unit 51 may overwrite the specific files with the new files in order from the oldest one when the total recording time of the files recorded in the above-mentioned buffer reaches a prescribed upper limit time.

The event information receiving unit 52 is configured to receive event information (information about prescribed events that have occurred with regard to the vehicle 2) from the first control device 14. For example, when the airbag 36 is deployed, information about deployment of the airbag 36 is transmitted from the shock absorbing device 10 to the event information receiving unit 52 via the first control device 14. Accordingly, the event information receiving unit 52 receives the information about the deployment of the airbag 36 from the first control device 14.

With reference to FIG. 3, the magnitude determining unit 53 is configured to determine the magnitude of the events whose information has been received by the event information receiving unit 52. For example, the magnitude determining unit 53 is configured to determine the magnitude of the events in three stages of high, middle, and low. For example, the events of high magnitude include a heavy collision (the vehicle collision accompanied by the deployment of the airbag 36) and an operation of the hood 37. For example, the events of middle magnitude include a light collision (the vehicle collision without the deployment of the airbag 36), an execution of MRM, an operation of an emergency brake during the automatic driving control, and an execution of SCM. For example, the events of low magnitude include an emergency evasive action by the occupant in response to a driving intervention request during automatic driving, an execution of RDM, and an execution of ALC. In another embodiment, the magnitude determining unit 53 may determine the magnitude of the events in two stages or four or more stages.

The upper limit number setting unit 54 is configured to set the upper limit number of the files whose overwriting is prohibited (hereinafter simply referred to as "the upper limit number") according to the magnitude of the events for the events of all the magnitude. For example, the upper limit number setting unit 54 is configured to set the same upper limit number (for example, 15) for the events of all the magnitude. Thus, the total number of files whose overwriting is prohibited can always be kept within a certain number (for example, within 45). Accordingly, it is possible to avoid a situation where the inside area of the recording device 21 is filled with the files whose overwriting is prohibited. In another embodiment, the upper limit number setting unit 54 may change the upper limit number according to the magnitude of the events such that the upper limit number gradually increases as the magnitude of the events increases. Alternatively, the upper limit number setting unit 54 may change the upper limit number according to the magnitude of the events such that the upper limit number gradually decreases as the magnitude of the events increases.

With reference to FIGS. 2 and 3, the tag providing unit 55 is configured to provide tags T0 to T3 (non-protection tag T0 or protection tags T1 to T3) to the files recorded in the inside area of the recording device 21. In the following, the way the tag providing unit 55 provides the tags T0 to T3 will be described.

The tag providing unit 55 is configured to provide the non-protection tags T0 to the files in which the surrounding image captured at occurrence of the events is not recorded. In another embodiment, the tag providing unit 55 may not provide any tag to the files in which the surrounding image captured at the occurrence of the events is not recorded.

The tag providing unit 55 is configured to provide any one of the protection tags T1 to T3 to the files in which the surrounding image captured at the occurrence of the events is recorded, and the protection tags T1 to T3 are of different types according to the magnitude of the events. For example, the tag providing unit 55 is configured to provide the protection tags T1 to the files in which the surrounding image captured at occurrence of the events of high magnitude is recorded, to provide the protection tags T2 to the files in which the surrounding image captured at occurrence of the events of middle magnitude is recorded, and to provide the protection tags T3 to the files in which the surrounding image captured at occurrence of the events of low magnitude is recorded.

In a case where the surrounding image captured at the time of plural events is recorded in one file, the tag providing unit 55 is configured to provide one of the protection tags T1 to T3 to the one file according to the magnitude of one event included in the plural events, and the magnitude of the one event is the highest of the magnitude of the plural events. For example, in FIG. 2, the surrounding image captured at the time of three events of high magnitude, middle magnitude, and low magnitude is recorded in the file F7. In this case, the tag providing unit 55 provides the protection tag T1 to the file F7 according to high magnitude. Accordingly, an appropriate protection tag T1 to T3 can be provided to the one file in a case where the plural events occur simultaneously.

The tag providing unit 55 is configured to provide the protection tags T1 to T3 to the files immediately before and after each file in which the surrounding image captured at occurrence of each event is recorded according to the magnitude of each event. For example, in FIG. 2, the surrounding image captured at occurrence of the event of low magnitude is recorded in the file F5. In this case, the tag providing unit 55 provides the protection tag T3 according to low magnitude to the file F4 immediately before the file F5, even if the surrounding image captured at the occurrence of each event is not recorded in the file F4. Accordingly, it is possible to protect not only each file in which the surrounding image captured at the occurrence of each event is recorded but also the files immediately before and after each file, and thus to easily identify the cause of each event.

Incidentally, the tag providing unit 55 is configured to provide a character string (for example, HIGH, MID, or LOW) indicating the magnitude of each event to the end of the file name of each file provided with one of the protection tags T1 to T3. Thus, it is possible to easily identify the magnitude of each event to which each file corresponds without playing each file provided with one of the protection tags T1 to T3.

The overwriting setting unit 56 is configured to change the tags T0 to T3 as necessary for the files recorded in the inside area of the recording device 21 and to set prohibition/permission of the overwriting of these files. In the following, the way the overwriting setting unit 56 changes the tags T0 to T3 and sets prohibition/permission of the overwriting will be described.

The overwriting setting unit 56 permits the overwriting of the files provided with the non-protection tags T0. Accordingly, the recording unit 51 overwrites the files provided with the non-protection tags T0 with new files in order from the oldest one.

The overwriting setting unit 56 prohibits the overwriting of the files (hereinafter referred to as "same tag files") provided with the protection tags T1 to T3 of the same type in a case where the number of same tag files is within the upper limit number. Accordingly, as long as the number of same tag files is within the upper limit number, the recording unit 51 does not overwrite the same tag files with the new files.

The overwriting setting unit 56 changes the tag of the oldest file of the same tag files from one of the protection tags T1 to T3 to the non-protection tag T0 and thus permits the overwriting of the above-mentioned oldest file in a case where the number of same tag files exceeds the upper limit number. Thus, the recording unit 51 overwrites the same tag files with the new files in order from the oldest one if the number of same tag files exceeds the upper limit number. Accordingly, it is possible to overwrite the files in proper order in a case where the same tag files need to be overwritten.

As described above, the recording device 21 according to the embodiment provides the protection tags T1 to T3 to the files, and the protection tags T1 to T3 are of different types according to the magnitude of the events. Also, the recording device 21 stops protecting the files only when the number of same tag files exceeds the upper limit number. Accordingly, it is possible to protect an appropriate number of files according to the magnitude of the events.

Further, in a case where the number of files provided with the protection tags T3 exceeds the upper limit number, only the files provided with the protection tags T3 become the object of overwriting and the files provided with the protection tags T1, T2 do not become the object of overwriting. Similarly, in a case where the number of files provided with the protection tags T2 exceeds the upper limit number, only the files provided with the protection tags T2 become the object of overwriting and the files provided with the protection tags T1 do not become the object of overwriting. In this way, it is possible to prevent the files corresponding to the events of the higher magnitude from becoming the object of overwriting when the number of files corresponding to the events of the lower magnitude exceeds the upper limit number.

<The Modifications>

In the above embodiment, the upper limit number setting unit 54 is configured to set the upper limit number according to the magnitude of the events for the events of all the magnitude. In another embodiment, as shown in FIG. 4, the upper limit number setting unit 54 may be configured to set the upper limit number according to the magnitude of the events for the events other than the events of highest magnitude, and may not set the upper limit number for the events of the highest magnitude. In this case, the overwriting setting unit 56 may be configured to always prohibit the overwriting of the files provided with the protection tags T1 corresponding to the events of the highest magnitude. Accordingly, it is possible to always protect the files provided with the protection tags T1 corresponding to the events of the highest magnitude, and thus to easily identify the cause of the events of the highest magnitude.

In the above embodiment, the tag providing unit 55 is configured to provide the protection tags T1 to T3 to the files immediately before and after each file in which the surrounding image captured at occurrence of each event is recorded according to the magnitude of each event. In another embodiment, as shown in FIG. 5, the tag providing unit 55 may be configured to set a reference time X (for example, 24 seconds) based on a time required for an emergency stop of the vehicle 2, and to provide one of the protection tags T1 to T3 corresponding to the magnitude of each event to each file in which the surrounding image captured at a time earlier than occurrence of each event by the reference time X is recorded. For example, in FIG. 5, the surrounding image captured at a time earlier than occurrence of the event of low magnitude by the reference time X is recorded in the file F4. In this case, the tag providing unit 55 provides the protection tag T3 according to low magnitude to the file F4, even if the surrounding image captured at the occurrence of each event is not recorded in file F4. Accordingly, it is possible to protect not only each file in which the surrounding image captured at occurrence of each event is recorded but also another file in which an important surrounding image regarding each event is likely to be recorded. Accordingly, it is possible to easily identify the cause of each event.

In the above embodiment, the image capturing device 45 is cited as an example of the vehicle information acquiring unit, and the recording device 21 records the surrounding image captured by the image capturing device 45 in the files for each time range in which the surrounding image is captured. In another embodiment, the vehicle sensor 8 may be cited as an example of the vehicle information acquiring unit, and the recording device 21 may record data of the vehicle states detected by the vehicle sensor 8 in the files for each time period in which the vehicle states are detected.

Concrete embodiments of the present invention have been described in the foregoing, but the present invention should not be limited by the foregoing embodiments and various modifications and alterations are possible within the scope of the present invention.

The invention claimed is:

1. A vehicle control system, comprising:
  a vehicle information acquiring unit configured to acquire vehicle information;
  a recording device configured to record the vehicle information in files for each time range in which the vehicle information is acquired; and
  a control device configured to execute automatic driving control of a vehicle,
  wherein the recording device includes:
  an event information receiving unit configured to receive information about prescribed events that have occurred with regard to the vehicle;
  a tag providing unit configured to provide protection tags to the files in which the vehicle information acquired at occurrence of the events is recorded, the protection tags being of different types according to magnitude of the events; and
  an overwriting setting unit configured to prohibit overwriting of the files provided with the protection tags of a same type in a case where a number of the files provided with the protection tags of the same type is within a prescribed upper limit number, and to permit the overwriting of the files provided with the protection tags of the same type in a case where the number of the files provided with the protection tags of the same type exceeds the upper limit number,
  wherein the tag providing unit is configured to provide a character string indicating the magnitude of each event to the file provided with one of the protection tags.

2. The vehicle control system according to claim 1, wherein the overwriting setting unit is configured to permit overwriting of an oldest file of the files provided with the protection tags of the same type in the case where the number of the files provided with the protection tags of the same type exceeds the upper limit number.

3. The vehicle control system according to claim 1, wherein the recording device further includes an upper limit number setting unit configured to set the upper limit number according to the magnitude of the events for the events of every magnitude.

4. The vehicle control system according to claim 1, wherein the recording device further includes an upper limit number setting unit configured to set the upper limit number according to the magnitude of the events for the events other than the events of highest magnitude, and
  the overwriting setting unit is configured to always prohibit overwriting of the files provided with the protection tags corresponding to the events of the highest magnitude.

5. The vehicle control system according to claim 1, wherein in a case where the vehicle information acquired at occurrence of plural events is recorded in one file, the tag providing unit is configured to provide the protection tag to the one file according to the magnitude of one event included in the plural events, the magnitude of the one event being the highest of the magnitude of the plural events.

6. The vehicle control system according to claim 1, wherein the tag providing unit is configured to provide the protection tags to the files immediately before and after each file in which the vehicle information acquired at the occurrence of each event is recorded.

7. The vehicle control system according to claim 1, wherein the tag providing unit is configured to set a reference time based on a time required for an emergency stop of the vehicle, and
  the tag providing unit is configured to provide the protection tag to each file in which the vehicle information acquired at a time earlier than the occurrence of each event by the reference time is recorded.

8. The vehicle control system according to claim 1, wherein the vehicle information acquiring unit includes an image capturing device configured to capture a surrounding image of the vehicle, and the image capturing device includes plural cameras configured to capture images of a front side, a rear side, a left side, and a right side of the vehicle, respectively.

9. The vehicle control system according to claim 1, wherein the tag providing unit is configured to provide non-protection tags to the files in which the vehicle information acquired at the occurrence of the events is not recorded.

* * * * *